United States Patent
Liu et al.

(10) Patent No.: US 10,347,901 B2
(45) Date of Patent: Jul. 9, 2019

(54) METHOD OF PREPARING LITHIUM ION BATTERY ELECTRODE HAVING IMPROVED LITHIUM ION TRANSPORT

(71) Applicant: Nissan North America, Inc., Franklin, TN (US)

(72) Inventors: Ying Liu, Walled Lake, MI (US); Taehee Han, West Bloomfield, MI (US); Yoshitaka Uehara, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 288 days.

(21) Appl. No.: 15/354,640

(22) Filed: Nov. 17, 2016

(65) Prior Publication Data
US 2018/0138493 A1    May 17, 2018

(51) Int. Cl.
*H01M 4/04* (2006.01)
*H01M 4/62* (2006.01)
*H01M 10/0525* (2010.01)
*H01M 4/13* (2010.01)
*H01M 4/139* (2010.01)
(Continued)

(52) U.S. Cl.
CPC .......... *H01M 4/0404* (2013.01); *H01M 4/04* (2013.01); *H01M 4/13* (2013.01); *H01M 4/139* (2013.01); *H01M 4/624* (2013.01); *H01M 4/626* (2013.01); *H01M 10/0525* (2013.01); *H01M 10/0565* (2013.01); *H01M 10/0566* (2013.01); *H01M 2004/021* (2013.01); *H01M 2300/0082* (2013.01); *Y02T 10/7011* (2013.01)

(58) Field of Classification Search
CPC .......... H01M 2/16; H01M 2/14; H01M 2/145; H01M 2300/00; H01M 4/362; H01M 4/364; H01M 4/368; H01M 10/00; H01M 10/052; H01M 10/058; H01M 4/00; H01M 4/16; H01M 4/22; H01M 4/26; H01M 4/602; H01M 4/604; H01M 4/626; H01M 4/137; H01M 4/0404; H01M 4/02; H01M 4/04; H01M 4/139; H01M 4/404; Y02E 60/122
USPC .................................. 429/322, 323, 231.95
See application file for complete search history.

(56) References Cited

U.S. PATENT DOCUMENTS 3,429,752 A    2/1969   Sundberg
2011/0104551 A1   5/2011   Yang et al.
(Continued)

OTHER PUBLICATIONS

Sander, J.S., et al., High-performance battery electrodes via magnetic templating, Nature Energy, 1(8) Jul. 11, 2016, pp. 1-7, Article No. 16099.*
(Continued)

*Primary Examiner* — Tabassom Tadayyon Eslami
(74) *Attorney, Agent, or Firm* — Young Basile Hanlon & MacFarlane, P.C.

(57) ABSTRACT

A method of preparing an electrode for a lithium-ion battery includes mixing a magnetic, electrically conductive material with a lithium conductive polymer; forming tubes of the polymer and magnetic, electrically conductive material; mixing the tubes with a slurry of an electrode material; coating a current collector with the slurry; and applying a magnetic field to the slurry to align the tubes within the slurry in relation to the current collector. The aligned tubes form electrical and ionic conductive pathways within the slurry. The tubes have a length less than half a thickness of the slurry.

20 Claims, 3 Drawing Sheets

(51) Int. Cl.
*H01M 10/0565* (2010.01)
*H01M 4/02* (2006.01)
*H01M 10/0566* (2010.01)

(56) References Cited

U.S. PATENT DOCUMENTS

2014/0038045 A1  2/2014  Lee et al.
2014/0186700 A1  7/2014  Bae et al.

OTHER PUBLICATIONS

Sander, J.S., et al., High-performance battery electrodes via magnetic templating, Nature Energy, Jul. 11, 2016, pp. 1-7, Article No. 16099.
Singh, Madhav, et al., Thick Electrodes for High Energy Lithium Ion Batteries, Journal of the Electrochmical Society, 2015, pp. A1196-A1201, vol. 162 (7).

* cited by examiner

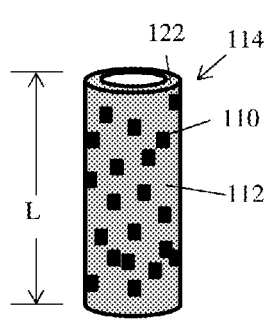 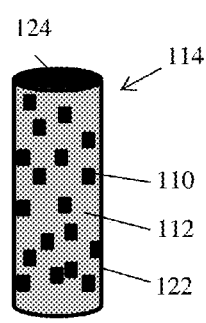 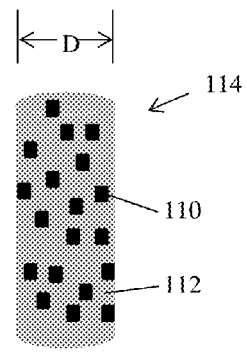
FIG. 2A     FIG. 2B     FIG. 2C
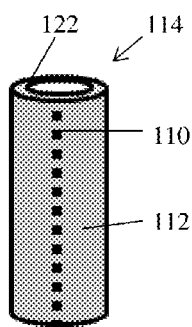 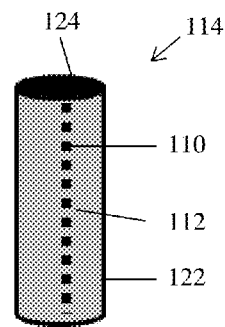 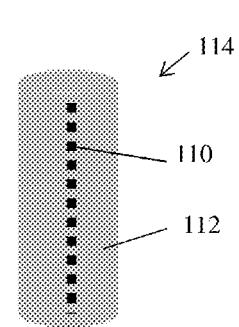
FIG. 3A     FIG. 3B     FIG. 3C

METHOD OF PREPARING LITHIUM ION BATTERY ELECTRODE HAVING IMPROVED LITHIUM ION TRANSPORT

TECHNICAL FIELD

This disclosure relates to a method of forming ionic conductive pathways in an electrode for a lithium ion battery.

BACKGROUND

Hybrid vehicles (HEV) and electric vehicles (EV) use chargeable-dischargeable energy storages. Secondary batteries such as lithium ion batteries are typical energy storages for HEV and EV vehicles. Lithium ion secondary batteries typically use carbon, such as graphite, as the anode electrode. The automotive industry is continually developing means of improving the energy density of these batteries. For example, the use of thicker battery electrodes is being investigated as one means of increasing the battery's energy density. Thicker electrodes pose new challenges, such as difficulty with lithium ion diffusion through the thicker active materials.

SUMMARY

Disclosed herein are methods of preparing an electrode for a lithium ion battery. One method includes mixing a magnetic, electrically conductive material with a lithium conductive polymer; forming tubes of the polymer and magnetic, electrically conductive material; mixing the tubes with a slurry of an electrode material; coating a current collector with the slurry; and applying a magnetic field to the slurry to align the tubes within the slurry. The aligned tubes form electrical and ionic conductive pathways within the slurry. The tubes have a length less than half a thickness of the slurry.

Another method of preparing an electrode for a lithium ion battery includes forming hollow tubes from a lithium ion conductive polymer and magnetic, electrically conductive particles, the particles embedded in the polymer; mixing the hollow tubes with a slurry of an electrode material; coating a current collector with the tube-containing slurry to form the active material layer having a predetermined thickness; and applying a magnetic field to the active material layer to align the hollow tubes within the slurry. The aligned hollow tubes form electrical and ionic conductive pathways within the slurry. The hollow tubes have a length between 30% and 40%, inclusive, of the thickness of the slurry.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 2A-2C are examples of tubes used to create the electrical and ionic conductive pathways within the electrode as disclosed herein.

FIGS. 3A-3C are other examples of tubes used to create the electrical and ionic conductive pathways within the electrode as disclosed herein.

DETAILED DESCRIPTION OF THE EMBODIMENTS

Lithium ion batteries include, for example, electrodes that are porous composites of solid-state active material particles bound together by a conductive carbon-binder mixture, with an ion-conducting liquid electrolyte filling the pores. Rates at which lithium ions are transported through the active material depend on the microscopic structure, or tortuosity, of the composite electrodes. To maximize the energy density of the lithium ion battery, electrodes with low porosity and high thickness are desired, reducing the number of unit cells required in the battery and thereby reducing the inactive components (separator, current collectors). However, electrodes with low porosity have high tortuosity, leading to poor or slow lithium ion transportation. The methods disclosed herein produce thick, dense electrodes with enhanced lithium ion transport, enabling the development of lithium ion batteries with high energy density and high power density.

Figure 1:
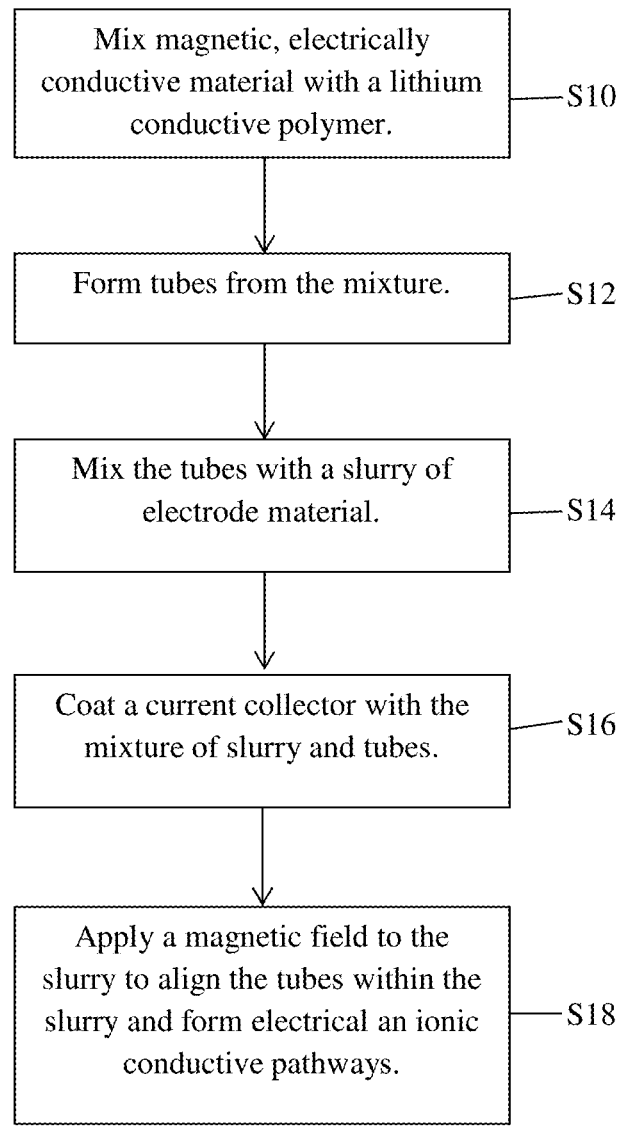
FIG. 1 is a flow diagram of a method of preparing an electrode for a lithium ion battery as disclosed herein.

FIG. 1 is a flow diagram of a method of preparing an electrode for a lithium ion battery. FIGS. 2-6 illustrate schematically the method of preparing the electrode 100. In step S10, a magnetic, electrically conductive material 110 is mixed with a lithium conductive polymer 112. In step S12, tubes 114 are formed of the lithium conductive polymer 112 and the magnetic, electrically conductive material 110. The tubes 114 are mixed with a slurry 116 of an electrode material in step S14. A current collector 118 is coated with the slurry 116 in step S16. In step S18, a magnetic field 120 is applied to the slurry 116 to align the tubes 114 within the slurry 116 in relation to the current collector 118. The aligned tubes 114 form electrical and ionic conductive pathways within the slurry 116. The aligned tubes 114 can be substantially perpendicular to the current collector 118.

The magnetic, electrically conductive material 110 can be, as non-limiting examples, iron(III) oxide, Fe—Ni alloy, Fe—Cr—Mo alloy, Fe—Cr—Co alloy and Mn—Al—C alloy. One or more of the materials 110 can be used. The magnetic, electrically conductive material 110 can be particles of the same or varying sizes.

The magnetic, electrically conductive material 110 is mixed with the lithium conductive polymer 112. The lithium conductive polymer 112 can be one or more of poly(ethylene oxide), poly(acrylonitrile), poly(methyl methacrylate), and poly(vinylidene fluoride), as non-limiting examples. The mixture is formed into tubes 114, as illustrated in FIGS. 2A-2C. In FIG. 2A, the tube 114 is hollow, with the magnetic, electrically conductive material 110 embedded in the wall 122 of the tube 114. In FIG. 2B, the tube 114 is hollow with closed ends 124. The magnetic, electrically conductive material 110 is embedded in the wall 122 of the tube 114 and can also be embedded in the closed ends 124. In FIG. 2C, the tube 114 is solid, with the magnetic, electrically conductive material 110 throughout the volume of the tube 114.

Each tube 114 has a diameter D equal to or greater than 10 μm and less than or equal to 20 μm. The tubes 114 can all have the same diameter D or the diameter D of the tubes can vary within the electrode 100. The diameter D can be uniform along a length L of the tube 114 or can vary between 10 μm and 20 μm, inclusive.

Optionally, while forming the tubes 114, a magnetic field can be applied to the newly formed tubes 114 prior to the polymer 110 drying or solidifying to align the magnetic, electrically conductive material 110 along the length L of the tube 114 as illustrated in FIGS. 3A-3C.

Figure 4:
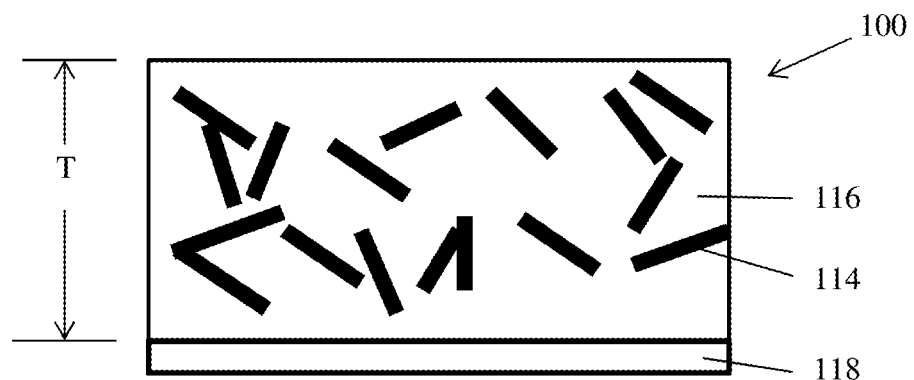
FIG. 4 is a schematic of a step of the method of FIG. 1 as disclosed herein.

The tubes 114 are then mixed with the slurry 116 of electrode material, the mixture then coated onto the current collector 118, as illustrated in FIG. 4. When the tubes 114 mixed with the slurry 116 are hollow, the tubes 114 will at least partially fill with the slurry 116 during mixing and coating. When the tubes 114 mixed with the slurry 116 are solid or have closed ends 124, the tubes 114 will remain hollow during the mixing and coating.

The electrode 100 has a thickness greater than the thickness of a conventional electrode, which is about 70 μm. As a non-limiting example, the slurry 116 mixed with the tubes 114 is coated onto the current collector 118, with the coating having a thickness T of about 500 μm. The length L of each tube 114 is less than half of the thickness T of the slurry 116. More particularly, the length L of each tube 114 is between 30% and 40%, inclusive, of the thickness T of the slurry 116. As a non-limiting example, if the slurry 116 has a thickness T of about 500 μm, then the tubes 114 have a length of between 150 μm and 200 μm, inclusive. The tubes 114 can all be approximately the same length or can vary between the range of 150 μm and 200 μm, inclusive.

The number of tubes 114 mixed into a volume of the slurry 116 is dependent upon the ratio of tube volume to slurry volume. The volume of the tubes 114 to the volume of the electrode material is between 20% and 30% inclusive.

Figure 5:
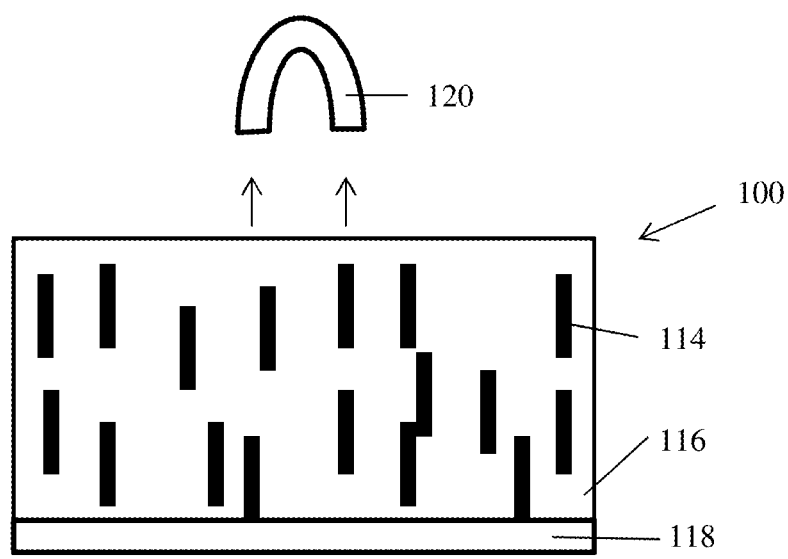
FIG. 5 is a schematic of another step of the method of FIG. 1 as disclosed herein.

As illustrated in FIG. 5, a magnetic field 120 is applied to the coated slurry 116 to align the tubes 114 within the slurry 116 to be perpendicular to the planar direction of the current collector 118. The magnetic field 120 draws the magnetic, electrically conductive material 110 in each of the tubes 114 in a single direction to align the tubes 114. The magnetic field 120 is applied to the slurry 116 while the slurry 116 is still wet so that the tubes 114 can move somewhat freely to align. As illustrated in FIG. 5, the tubes 114 may not necessarily be highly uniformly distributed throughout the volume of the electrode material. However, using a uniform magnetic field 120 across the surface 126 of the slurry 116 opposite the current collector 118 soon after mixing and coating the slurry 116 and tubes 114 will result in the tubes 114 being distributed in a sufficiently uniform manner to provide electrical and ionic conductive pathways within the resulting electrode 100.

Once the tubes 114 are aligned in the slurry 116, the electrode 100 can be dried using an oven or a hot plate, as non-limiting examples. The dried slurry can then be soaked with electrolyte. If the tubes 114 used to create the electrical and ionic conductive pathways were hollow, the electrolyte will penetrate slurry and/or empty space within the tubes 114. If the tubes 114 used to create the electrical and ionic conductive pathways had closed ends 124, the electrolyte will penetrate the closed ends 124 to fill the hollow cavity of the tubes 114. The electrical and ionic conductive pathways transport lithium ions along the lithium conductive polymer 112, allowing for the production of thick, dense electrodes with high energy density and high power density.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A or B, X can include A alone, X can include B alone or X can include both A and B. In addition, the articles "a" and "an" as used in this application and the appended claims should generally be construed to mean "one or more" unless specified otherwise or clear from context to be directed to a singular form.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method of preparing an electrode for a lithium-ion battery, the method comprising:
    mixing a magnetic, electrically conductive material with a lithium conductive polymer;
    forming tubes of the polymer and magnetic, electrically conductive material;
    mixing the tubes with a slurry of an electrode material;
    coating a current collector with the slurry; and
    applying a magnetic field to the slurry to align the tubes within the slurry, the aligned tubes forming electrical and ionic conductive pathways within the slurry, the tubes having a length less than half a thickness of the slurry.

2. The method of claim 1, further comprising: drying the electrode after the magnetic field is applied.

3. The method of claim 1, wherein the polymer is one or more of poly(ethylene oxide), poly(acrylonitrile), poly(methyl methacrylate), and poly(vinylidene fluoride).

4. The method of claim 1, wherein the magnetic, electrically conductive material is one or more of iron(III) oxide, Fe—Ni alloy, Fe—Cr—Mo alloy, Fe—Cr—Co alloy and Mn—Al—C alloy.

5. The method of claim 1, wherein the tubes are internally filled with the magnetic, electrically conductive material.

6. The method of claim 1, wherein the tubes are hollow and at least partially fill with slurry during mixing.

7. The method of claim 1, wherein the tubes are hollow with closed ends.

8. The method of claim 7, further comprising:
    drying the electrode after the magnetic field is applied; and
    soaking the dried slurry with electrolyte, the electrolyte penetrating the closed ends of the tubes.

9. The method of claim 1, wherein each tube has a diameter equal to or greater than 10 μm and less than or equal to 20 μm.

10. The method of claim 9, wherein a volume of the tubes to a volume of the electrode material is between 20% and 30% inclusive.

11. The method of claim 1, wherein the length of each tube is between 30% and 40%, inclusive, of the thickness of the slurry.

12. The method of claim 11, wherein the thickness of the slurry is 500 μm.

13. The method of claim 1, further comprising:
while forming the tubes, applying a magnetic field to the polymer with the magnetic, electrically conductive material to align the magnetic, electrically conductive material along a length of the tube.

14. A method of preparing an electrode for a lithium-ion battery, the method comprising:
forming hollow tubes from a lithium ion conductive polymer and magnetic, electrically conductive particles, the particles embedded in the polymer;
mixing the hollow tubes with a slurry of an electrode material;
coating a current collector with the tube-containing slurry to form the active material layer having a predetermined thickness; and
applying a magnetic field to the active material layer to align the hollow tubes within the slurry, the aligned hollow tubes forming electrical and ionic conductive pathways within the slurry, the hollow tubes having a length between 30% and 40%, inclusive, of the thickness of the slurry.

15. The method of claim 14, wherein the lithium ion conducting polymer is one or more of poly(ethylene oxide), poly(acrylonitrile), poly(methyl methacrylate), and poly(vinylidene fluoride).

16. The method of claim 14, wherein the magnetic, electrically conductive material is one or more of iron(III) oxide, Fe—Ni alloy, Fe—Cr—Mo alloy, Fe—Cr—Co alloy and Mn—Al—C alloy.

17. The method of claim 14, wherein the hollow tubes have closed ends.

18. The method of claim 17, further comprising:
drying the active material layer after the magnetic field is applied; and
soaking the dried active material layer with electrolyte, the electrolyte penetrating the closed ends of the hollow tubes.

19. The method of claim 14, wherein each hollow tube has a diameter equal to or greater than 10 μm and less than or equal to 20 μm.

20. The method of claim 19, wherein a volume of the hollow tubes to a volume of the electrode material is 20% to 30% inclusive.

* * * * *